US012680196B2

(12) United States Patent
Green et al.

(10) Patent No.: US 12,680,196 B2
(45) Date of Patent: Jul. 14, 2026

(54) ENCAPSULANT-CONTAINING POLYMER CAPSULES AND FIBERS AND COMPOSITES INCLUDING SAME

(71) Applicant: Arizona Board of Regents on behalf of Arizona State University, Scottsdale, AZ (US)

(72) Inventors: Matthew Green, Phoenix, AZ (US); Mani Modayil Korah, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 341 days.

(21) Appl. No.: 18/039,322

(22) PCT Filed: Jan. 20, 2022

(86) PCT No.: PCT/US2022/013160
§ 371 (c)(1),
(2) Date: May 30, 2023

(87) PCT Pub. No.: WO2022/159605
PCT Pub. Date: Jul. 28, 2022

(65) Prior Publication Data
US 2024/0003058 A1      Jan. 4, 2024

Related U.S. Application Data

(60) Provisional application No. 63/139,726, filed on Jan. 20, 2021, provisional application No. 63/139,728, filed on Jan. 20, 2021.

(51) Int. Cl.
*D01D 5/00*      (2006.01)
*B01J 13/02*      (2006.01)
(Continued)

(52) U.S. Cl.
CPC .......... *D01D 5/0038* (2013.01); *B01J 13/043* (2013.01); *B01J 13/125* (2013.01); *D01D 1/02* (2013.01); *D01D 5/24* (2013.01)

(58) Field of Classification Search
None
See application file for complete search history.

(56) References Cited

U.S. PATENT DOCUMENTS 10,195,571 B2 *   2/2019   Weitz ...................... B01F 25/14
2006/0051425 A1 *   3/2006   Kvitnitsky .............. A61P 43/00
424/769
(Continued)

FOREIGN PATENT DOCUMENTS

WO      WO-2018161071 A1 *   9/2018   ........... A61K 9/5192
WO      2020005402 A1   1/2020

OTHER PUBLICATIONS

Dowding, Peter J., et al. "Oil core-polymer shell microcapsules prepared by internal phase separation from emulsion droplets. I. Characterization and release rates for microcapsules with polystyrene shells." Langmuir 20.26 (2004): 11374-11379.
(Continued)

*Primary Examiner* — Emmanuel S Luk
(74) *Attorney, Agent, or Firm* — Fish & Richardson P.C.

(57)      ABSTRACT

Systems and methods for preparing encapsulant-containing polymer capsules and fibers, as well as the encapsulant-containing polymer capsules and fibers and composites including the same are described. In one example, forming a plurality of encapsulant-containing polymer capsules includes preparing a mixture comprising a polymer, a solvent, an encapsulant, and a polymer that is soluble in the solvent, and removing some of the solvent from the mixture to yield the plurality of polymer capsules. Each polymer capsule include a shell formed of the polymer and contains the encapsulant. In another example, forming a plurality of
(Continued)

polymer fibers containing an encapsulant includes providing the mixture to an electrospin apparatus and electrospinning the mixture to yield the plurality polymer fibers, where each polymer fiber defines a hollow core that contains the encapsulant.

9 Claims, 12 Drawing Sheets

(51) Int. Cl.
| | |
|---|---|
| *B01J 13/04* | (2006.01) |
| *B01J 13/12* | (2006.01) |
| *D01D 1/02* | (2006.01) |
| *D01D 5/24* | (2006.01) |

(56) References Cited

U.S. PATENT DOCUMENTS

| | | | | |
|---|---|---|---|---|
| 2006/0167147 | A1* | 7/2006 | Asgari | B01J 13/0091 |
| | | | | 524/265 |
| 2006/0234053 | A1* | 10/2006 | Yamamoto | B01J 13/22 |
| | | | | 428/402.2 |
| 2008/0006604 | A1* | 1/2008 | Keady | G03F 7/0002 |
| | | | | 216/87 |
| 2009/0035381 | A1* | 2/2009 | Stankus | A61K 9/5073 |
| | | | | 514/772.3 |
| 2011/0031638 | A1 | 2/2011 | Andrady | |
| 2011/0217544 | A1* | 9/2011 | Young | H10F 77/45 |
| | | | | 977/773 |
| 2013/0072596 | A1* | 3/2013 | White | B01J 13/22 |
| | | | | 524/542 |
| 2015/0368407 | A1 | 12/2015 | Zhang | |
| 2016/0375413 | A1* | 12/2016 | Weitz | B01F 33/30 |
| | | | | 428/402.21 |
| 2018/0185809 | A1* | 7/2018 | Walters | B01F 29/87 |
| 2020/0001263 | A1 | 1/2020 | Batty | |
| 2020/0016564 | A1 | 1/2020 | Surwade | |
| 2020/0339857 | A1* | 10/2020 | DeWitt | D01D 1/02 |
| 2020/0368168 | A1* | 11/2020 | Shao | A61K 9/4833 |
| 2022/0304936 | A1* | 9/2022 | Draganoiu | A61K 31/496 |
| 2024/0108584 | A1* | 4/2024 | Lannutti | A61K 47/34 |
| 2024/0361331 | A1* | 10/2024 | Stein | G01N 33/48721 |

OTHER PUBLICATIONS

Fei, Ling, et al. "Graphene oxide involved air-controlled electrospray for uniform, fast, instantly dry, and binder-free electrode fabrication." ACS applied materials & interfaces 9.11 (2017): 9738-9746.
Green Matthew, Korah Mani Modayil, Yan Shen, "Nanofiber-Ionic Liquid Capsule Composite Membrane Mats for CO2 Capture", Skysong Innovations, (Oct. 11, 2021), Skysong Innovations, (Sep. 7, 2022), XP055958740.
Mithaiwala Husain, Tronstad Zachary T, Korah Mani Modayil, Buffington Alexander, Green Matthew D, "Crosslinked electrospun composite membranes of poly(vinyl alcohol) and poly(vinyl chloride): tunable mechanical properties, porosity and performance", Polymer International, Barking, GB, GB , (Oct. 1, 2021), vol. 70, No. 10, doi:10.1002/pi.6224, ISSN 0959-8103, pp. 1495-1507, XP055958741.
Moya, Cristian, et al. "Encapsulation of ionic liquids with an aprotic heterocyclic anion (AHA-IL) for CO2 capture: preserving the favorable thermodynamics and enhancing the kinetics of absorption." The Journal of Physical Chemistry B 122.9 (2018): 2616-2626.
Shi Ting, Livi Sébastien, Duchet Jannick, Gérard Jean-François, "Ionic Liquids-Containing Silica Microcapsules: A Potential Tunable Platform for Shaping-Up Epoxy-Based Composite Materials?", Nanomaterials, (May 2, 2020), vol. 10, No. 5, pp. 1-12, doi:10.3390/nano10050881, XP055958738.
Song, Tangqiumei, et al. "Recyclability of encapsulated ionic liquids for post-combustion CO2 capture." Industrial & Engineering Chemistry Research 58.12 (2019): 4997-5007.
Stolaroff, Joshuah K., et al. "CO2 absorption kinetics of micro-encapsulated ionic liquids." Energy Procedia 114 (2017): 860-865.
Wang, Xianfeng, et al. "Immobilization of amino acid ionic liquids into nanoporous microspheres as robust sorbents for CO 2 capture." Journal of Materials Chemistry A 1.9 (2013): 2978-2982.
Yang, W. W., et al. "Monodispersed microcapsules enclosing ionic liquid of 1-butyl-3-methylimidazolium hexafluorophosphate." Reactive and Functional Polymers 67.1 (2007): 81-86.

* cited by examiner

ENCAPSULANT-CONTAINING POLYMER CAPSULES AND FIBERS AND COMPOSITES INCLUDING SAME

CROSS-REFERENCE TO RELATED APPLICATIONS

This application is a National Stage Application under 35 U.S.C. § 371 of International Application No. PCT/US2022/013160, filed on Jan. 20, 2022, which claims the benefit of U.S. Provisional Patent Application No. 63/139,726 filed on Jan. 20, 2021, and U.S. Provisional Patent Application No. 63/139,728 filed on Jan. 20, 2021, the contents which are incorporated by reference herein in their entireties.

STATEMENT OF GOVERNMENT INTEREST

This invention was made with government support under 80NSSC18K1508 awarded by the National Aeronautical & Space Administration. The government has certain rights in the invention.

TECHNICAL FIELD

This disclosure describes systems and methods for preparing encapsulant-containing polymer capsules and fibers, as well as the encapsulant-containing polymer capsules and fibers and composites including the same.

BACKGROUND

Carbon sequestration, a process of capturing and storing carbon dioxide from the atmosphere, can be achieved by a variety of natural and artificial biological, physical, and chemical processes. Some chemical sequestration processes include the absorption of carbon dioxide in a material that has a high solubility selectivity for carbon dioxide relative to other gases.

SUMMARY

This disclosure describes systems and methods for preparing encapsulant-containing polymer capsules and fibers, as well as the encapsulant-containing polymer capsules and fibers and composites including the same.

Embodiment 1 is a method of forming a plurality of polymer capsules containing an encapsulant, the method comprising:

preparing a mixture comprising a polymer, a solvent, and an encapsulant, wherein the polymer is soluble in the solvent; and removing some of the solvent from the mixture to yield the plurality of polymer capsules, wherein each polymer capsule comprises a shell formed of the polymer and contains the encapsulant.

Embodiment 2 is a method of embodiment 1, wherein the solvent comprises water, dimethylformamide, tetrahydrofuran, chloroform, or any mixture thereof.

Embodiment 3 is a method of embodiment 1 or 2, wherein the encapsulant comprises an alkane or an ionic liquid.

Embodiment 4 is a method of embodiment 3, wherein the ionic liquid comprises phosphonium, ammonium, or imidazolium based ionic liquids.

Embodiment 5 is a method of embodiment 4, wherein the ionic liquid comprises 1-butyl-3-methylimidazolium bis(trifluoromethylsulfonyl)imide or bis(2,4,4-trimethylpentyl) phosphinate.

Embodiment 6 is a method of any one of embodiments 1 through 5, wherein the polymer comprises polysulfone, polyacrylonitrile, polyvinyl chloride, polyvinylidene fluoride, or poly(methyl methacrylate).

Embodiment 7 is a method of any one of embodiments 1 through 6, wherein the polymer capsules have a diameter in a range of about 500 nm to about 20 µm.

Embodiment 8 is a method of any one of embodiments 1 through 7, further comprising providing the mixture to a gas-assisted electrospray apparatus, and wherein removing some of the solvent comprises ejecting the mixture from the gas-assisted electrospray apparatus.

Embodiment 9 is a method of forming a plurality of polymer fibers containing an encapsulant, the method comprising:

providing a mixture comprising a polymer, a solvent, and an encapsulant to an electrospin apparatus, wherein the polymer is soluble in the solvent; and electrospinning the mixture to yield the plurality polymer fibers, wherein each polymer fiber of the plurality of polymer fibers defines a hollow core that contains the encapsulant.

Embodiment 10 is a method of forming a fiber composite, the method comprising:

providing an electrospin solution to an electrospin apparatus;

electrospinning a polymer fiber with the electrospin apparatus;

disposing the polymer fiber on a substrate;

providing an electrospray solution to an electrospray apparatus;

forming a plurality of encapsulant-containing polymer capsules with the electrospray process; and disposing the plurality encapsulant-containing polymer capsules directly on the polymer fiber.

Embodiment 11 is a method of embodiment 10, wherein the encapsulant comprises an ionic liquid.

Embodiment 12 is a method of embodiment 11, wherein each encapsulant-containing polymer capsule of the plurality of encapsulant-containing polymer capsules comprises a polymer shell and an ionic liquid core.

Embodiment 13 is a method of any one of the embodiments 10 through 12, wherein each encapsulant-containing polymer capsule of the plurality of encapsulant-containing polymer capsules has a diameter in a range of 500 nm to 10 µm.

Embodiment 14 is a method of any one of the embodiments 10 through 13, wherein providing the electrospin solution to the electrospin apparatus comprises ejecting the electrospin solution through a first nozzle and onto the substrate.

Embodiment 15 is a method of embodiment 14, wherein disposing the encapsulant-containing polymer capsules directly in the polymer fiber comprises ejecting the encapsulant-containing polymer capsules through a second nozzle and onto the polymer fiber.

Embodiment 16 is any one of embodiments 10 through 15, wherein the substrate comprises a cylinder configured to rotate about an axis perpendicular to a liquid flow path of the first nozzle and the second nozzle.

Embodiment 17 is any one of embodiments 10 through 16, wherein the electrospin solution comprises a polymer, a solvent, and an encapsulant, and the polymer is soluble in the solvent.

Embodiment 18 is a system comprising:

an electrospin apparatus comprising a first nozzle;

an electrospray apparatus comprising a second nozzle; and a cylinder positioned between the first nozzle and the second nozzle, wherein the cylinder is configured to rotate about an axis perpendicular to a liquid flow path of the first nozzle and a liquid flow path of the second nozzle, wherein the electrospin apparatus is configured to dispose a polymer fiber on the cylinder, and the electrospray apparatus is configured to embed encapsulant-containing polymer capsules in the polymer fiber.

Embodiment 19 is a fiber composite comprising:

an electrospun fiber; and a plurality of encapsulant-containing polymer capsules embedded in the electrospun fiber, wherein each encapsulant-containing polymer capsule in the plurality of encapsulant-containing polymer capsules has a diameter in a range of about 500 nm to about 10 μm.

Embodiment 20 is a fiber composite of embodiment 19, wherein each encapsulant-containing polymer capsule of the plurality of encapsulant-containing polymer capsules has a polymer shell and an ionic liquid core.

Embodiment 21 is a fiber composite of embodiment 19 or 20, wherein the polymer shell comprises a polymer functionalized with an ionic liquid.

Embodiment 22 is the fiber composite of any one of embodiments 19 through 21, wherein the polymer comprises polysulfone, polyacrylonitrile, polyvinylidenefluoride, poly(methyl methacrylate), polystyrene, polyimide, polybenzimidazole, or a combination thereof.

Systems and methods described herein are fast, tunable, scalable, and can be used to obtain a wide variety of encapsulant-containing polymer capsules and fibers with polymer shells. In some examples, the encapsulant is an ionic liquids (IL). The encapsulant-containing polymer capsules can be embedded in polymer fiber mats. The encapsulant-containing polymer capsules are obtained without sonication and can be embedded in a polymer membrane to obtain composites without additional steps. The polymer shell and fiber material can be changed by using a different polymer. The encapsulant-containing polymer capsules and fibers can be advantageously obtained within minutes to a few hours without sonication or external drying. The electrospray-encapsulation process is scalable and can be implemented with multiple nozzles. Moreover, capsule size and thickness, fiber diameter, and nonwoven mat porosity and thickness can be tuned to yield composites with selected properties.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure describes systems and methods for preparing encapsulant-containing polymer capsules and fibers, as well as the encapsulant-containing polymer capsules and fibers and composites including the same. In one example, the encapsulant is an ionic liquid (IL). In some embodiments, composites that include encapsulant-containing polymer capsules embedded in a polymer fiber are used in an apparatus configured to capture carbon dioxide. In one example, the composite includes ionic liquid (IL)-containing polymer capsules embedded in a charged polymer fiber matrix. Composites and capsules described herein can be formed on surfaces or embedded into polymer membrane composites, respectively. The embedding can be achieved directly in a single step.

ILs are nonvolatile, have high electrochemical stability, are typically free of thermal transitions over a wide range of temperatures, and have chemical structures that can be tailored for high $CO_2$ solubility and a high solubility selectivity for $CO_2$ over other gases. When supported within a polymer matrix, ILs can be deployed in micro-gravity environments in the form of a supported IL membrane (SILM). Examples of polymer matrices for supporting ILs include porous ion-modified polysulfones. Polysulfone exhibits robust thermomechanical performance and longevity. With the addition of charged sites, polysulfone increases the IL loading capacity and inhibits or prevents IL leaching. This facilitates manufacturing $CO_2$ removal assemblies with i) high $CO_2$ adsorption capacity and adequate flux to enable maintenance-free $CO_2$ removal; ii) improved longevity or module stability, which will reduce maintenance schedules; and iii) adaptability for integration into other life support systems.

IL uptake by a polymer fiber can be improved by physical modification of the polymer fiber, chemical modification of the polymer fiber, or both. As used herein, "ionic liquid" generally refers to a salt in the liquid state. Physical modifications include creating morphologies to increase IL uptake. Morphologies described herein include forming IL-containing polymer capsules by an electrospray process, forming IL-containing polymer capsules by an emulsion-based encapsulation process, forming polymer fiber-capsule composites, and forming hollow polymer fibers. Chemical modification includes addition of charge sites in the polymer to increase IL loading and inhibit or prevent IL leaching.

Figure 1:
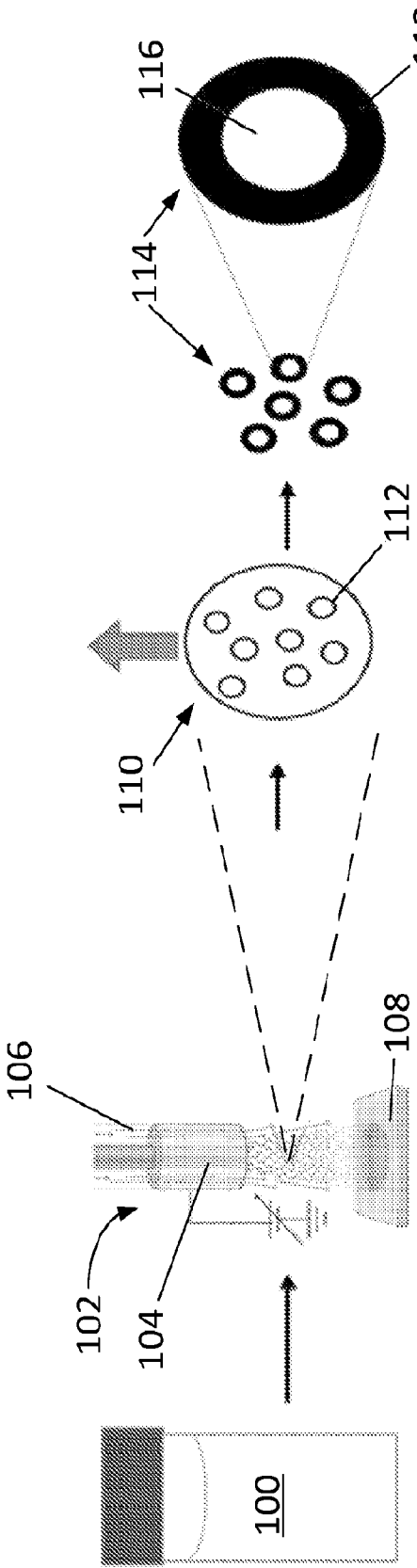
FIG. 1 is a schematic diagram depicting a single phase electrospray process for forming polymer capsules containing an encapsulant.

FIG. 1 is a schematic diagram depicting the formation of micro- and nanoscale encapsulant-containing polymer capsules by electrospray encapsulation. In electrospray encapsulation, an electrospray solution is provided to an electrospray apparatus, where it is subjected to a high speed air stream. Suitable electrospray solutions include a mixture of polymer, encapsulant, and solvent. In some embodiments, an electrospray solution includes about 2 wt % to 15 wt % polymer, up to about 2 wt % encapsulant, and about 90 wt % to about 98 wt % solvent. The solvent and encapsulant are both liquids. The polymer is soluble in the solvent, which has a lower boiling point (or vapor pressure) than the encapsulant. The encapsulant is less volatile than the solvent (e.g., has a higher boiling point than the solvent under conditions that are otherwise the same). The polymer is less soluble in the encapsulant than in the solvent.

To prepare electrospray solution 100, the polymer is dissolved in the solvent to yield a solubilized polymer solution. Examples of suitable polymers include polysulfone (PSf), polyacrylonitrile (PAN), polyvinylidenefluoride (PVDF), poly(methyl methacrylate) (PMMA), and other polar polymers. A molecular weight of the polymer is typically in a range of 5-85 kDa (e.g., for step-growth polymers such as PSF) or 15-500 kDa for chain-growth polymers such as PAN, PVDF, and PMMA. Examples of suitable solvents include water as well as organic solvents such as dichloromethane (DCM), dimethylformamide (DMF), tetrahydrofuran (THF), chloroform ($CHCl_3$), dimethylacetamide (DMAc), acetonitrile (ACN), dimethylsulfoxide (DMSO), and N-methylpyrrolidone (NMP). The solubilized polymer solution typically includes about 5 wt % to about 10 wt % polymer.

The encapsulant is combined with the solubilized polymer solution to yield the electrospray solution. Suitable encapsulants include alkanes (e.g., hexadecane) and ionic liquids such as dialkylimidazoliums, tetraalkylammoniums, and tetraalkylphosphoniums, with a variety of counteranions (e.g., bromide, iodide, chloride, tosylate, triflate, bis(trifluoromethylsulfonyl)imide, hexafluorophosphate, tetrafluoroborate) and cations (e.g., with a range of independent alkyl lengths). Examples of suitable ionic liquids include 1-butyl-3-methylimidazolium bromide and 1,3-dimethylimidazolium bromide. Other phosphonium, ammonium and imidazolium based ILs are also suitable. Examples of suitable imidazolium and phosphonium based ILs include 1-butyl-3-methylimidazolium bis(trifluoromethylsulfonyl)imide and bis(2,4,4-trimethylpentyl)phosphinate). Other suitable IL structures with a variety of alkyl substituents, cations, and counterions can also be used. The charge on the polymer and the IL can be tailored to maximize polymer-IL interactions and selective $CO_2$ solubility.

Referring to FIG. 1, electrospray solution 100 is allowed to stand for a length of time (e.g., an hour) to yield a single phase solution including the polymer, the encapsulant, and the solvent. The single phase solution is provided to electrospray apparatus 102, and ejected though nozzle 104 along with pressurized gas 106 in a gas-assisted electrospray process. Pressurized gas 106 typically has a pressure in a range of 5 to 40 psi. Examples of suitable gases include air, nitrogen, and argon. An internal phase separation and drying process of the capsules takes place in transit of the spray from the nozzle tip to collector 108. Interaction of the pressurized gas and the single phase solution yields precursor capsules 110 with a mixture of the solvent and the encapsulant contained in polymer shell 112. The solvent evaporates from precursor capsules 110 to yield encapsulant-containing polymer capsules 114 with encapsulant core 116 enclosed by polymer shell 112. This electrospray encapsulation process can be achieved in the absence of external drying, emulsification, or both. Encapsulant-containing polymer capsules 114 typically have a diameter in a range of about 500 nm to about 10 μm (e.g., about 500 nm to about 5 μm) and a thickness of polymer shell 112 in a range of about 100 nm to about 2 μm. The process is scalable with multiple nozzles, and the size capsules and thickness of the polymer shell are tunable.

The electrospray process, which can be a continuous (e.g., roll-to-roll) process, makes capsule production scalable, tunable, and with the added benefit of easy incorporation into composite materials such as polymer membranes for enhanced $CO_2$ capture. Capsule morphology can be controlled by changing process parameters such as mixing speed, concentration, and surfactant chemistry. One exemplary process includes formation of a uniform coating of IL-containing polymer capsules on a substrate.

Figure 2A:
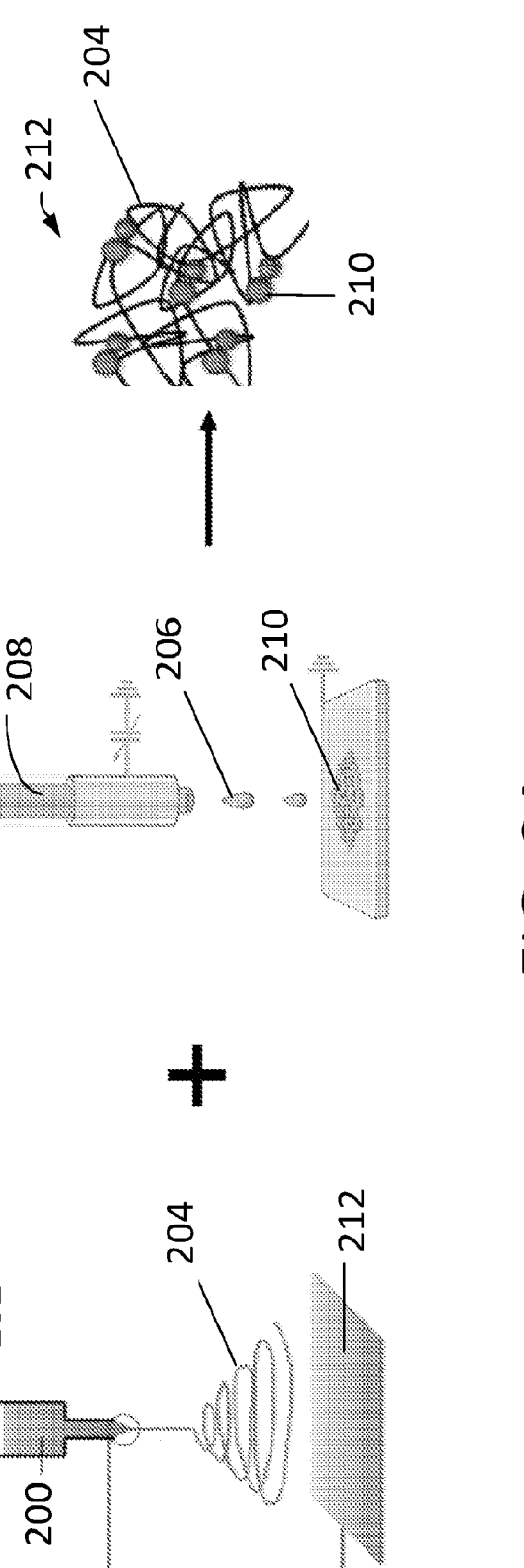
FIG. 2A is a schematic diagram depicting the formation of a polymer fiber-capsule composite.

FIG. 2A is a schematic diagram depicting an electrospin-electrospray encapsulation process to fabricate composites including a fiber membrane and encapsulant-containing polymer capsules. Electrospin solution 200 is provided to electrospin apparatus 202 to fabricate fibers 204 (e.g., nanofibers). Electrospray solution 206 is provided to electrospray apparatus 208 to yield encapsulant-containing polymer capsules 210 in a process similar to that described with respect to FIG. 1. Electrospinning and electrospraying can be performed sequentially or simultaneously to yield composite 212 including fibers 204 embedded with encapsulant-containing polymer capsules 210.

Figure 2B:
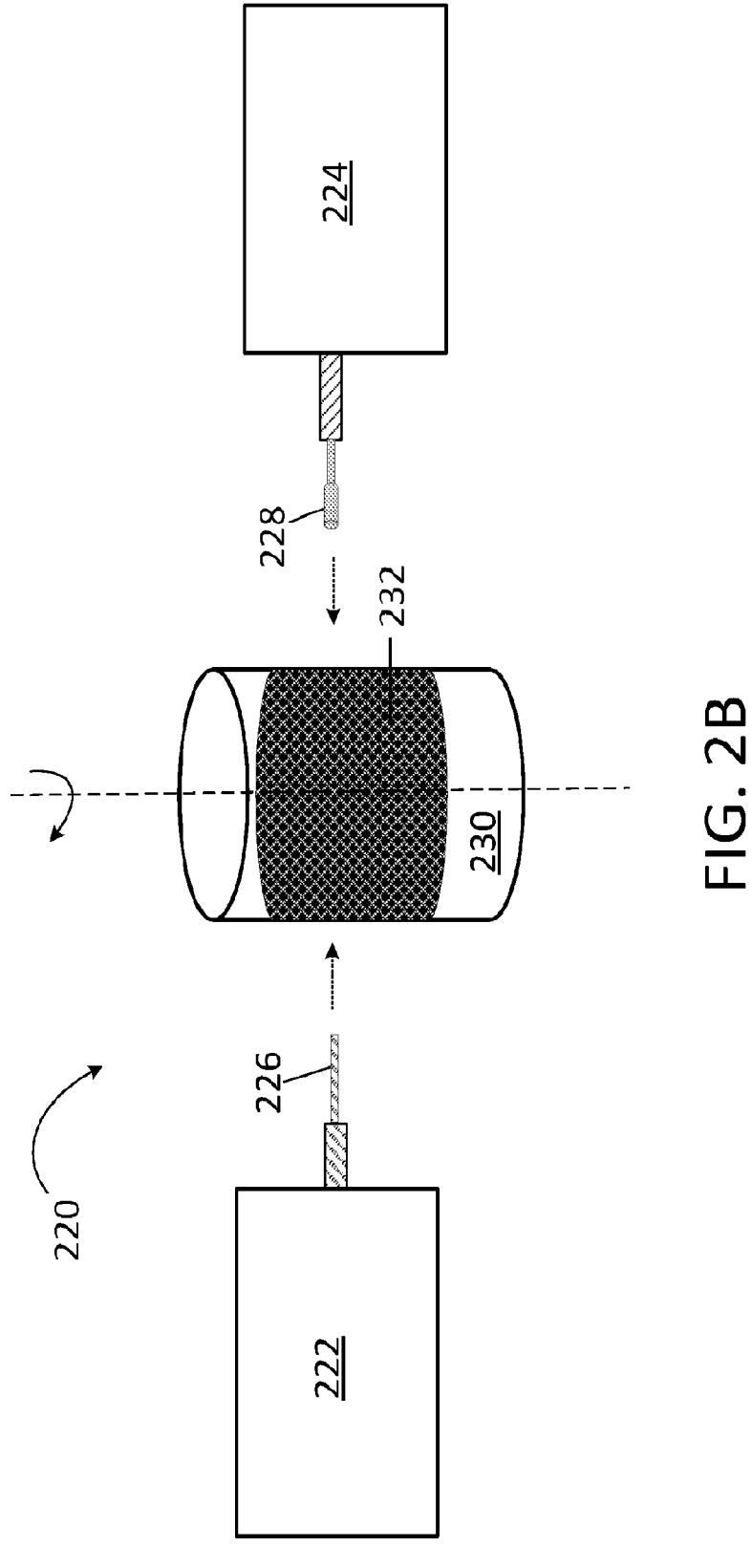
FIG. 2B depicts an electrospin-electrospray apparatus for the formation of composites of fibers and encapsulant-containing polymers.

FIG. 2B depicts an embodiment of the process described with respect to FIG. 2A, in which electrospinning and electrospraying are performed simultaneously with polymer solutions to fabricate a composite including a fiber membrane and encapsulant-containing polymer capsules. Suitable electrospray solutions are described with respect to FIG. 1. The electrospin solution includes a polymer dissolved in a solvent. Examples of suitable polymers include polysulfones, polyacrylonitriles, polyvinyl chlorides, polyvinylidene fluorides, and poly(methyl methacrylates). Examples of suitable solvents include dichloromethane (DCM), dimethylformamide (DMF), tetrahydrofuran (THF), methylene chloride ($CHCl_3$), dimethylacetamide (DMAc), acrylonitrile (ACN), dimethylsulfoxide (DMSO), and N-methyl-2-pyrrolidone (NMP). The electrospin solution typically includes 5-40 wt % polymer and 60-95 wt % solvent, with a concentration of the polymer typically selected to be above its critical entanglement concentration. A polymer concentration above the critical entanglement is sufficient to promote polymer entanglements, thereby resulting in the formation of fibers. In some cases, one or more additives (e.g., salts or surfactants) are combined with the electrospin solution to alter a conductivity or surface tension of the solution.

Electrospin-electrospray apparatus 220 includes electrospin apparatus 222 and electrospray apparatus 224 with nozzles 226 and 228, respectively. Nozzles 226 and 228 are configured to direct electrospin solution and electrospray solution, respectively, toward collector 230. A distance between a tip of nozzle 226 and a tip of nozzle 228 is typically in a range of 5 cm to 35 cm. The voltage at the nozzles is typically in a range between 10 kV and 30 kV. As depicted in FIG. 2B, collector 230 is a cylinder configured to rotate about an axis perpendicular to the liquid pathway in nozzles 226 and 228. A single step process is used in which air controlled electrospraying is performed together with electrospinning onto collector 230 to fabricate composite 232 by disposing the fibers and the encapsulant-containing polymer capsules on collector 230 simultaneously. Collector 230 is electrically grounded and can be coated, wrapped, or covered with a substrate (e.g., aluminum foil) on which composite 232 is collected. Flow rates of the electrospray solution and the electrospin solution are typically in a range of 0.5 mL/hr to 4 mL/hr. The resulting composite includes encapsulant-containing polymer capsules in a size range of 500 nm to 10 μm embedded in a porous fiber membrane with fibers having a diameter in a range of about 500 nm to about 50 μm.

The simultaneous electrospraying of encapsulant-containing polymer capsules along with electrospinning of fibers onto collector 230 allows for the preparation of composites that are made in a single step as well as control over morphology. The resulting composites can be used to make high performance CO$_2$ capture membranes with high ionic liquid loading and large surface area of contact towards CO$_2$.

The method described with respect to FIG. 2B can be implemented as a continuous process and allows for uniform incorporation of capsules onto the fiber membranes. In one implementation, fiber-encapsulant capsule composites are prepared in a roll-to-roll process. The process can also be modified to yield film capsule composites by using two simultaneous electrospraying processes rather than simultaneous electrospraying and electrospinning processes. Another implementation includes flat sheet processing.

Figure 3:
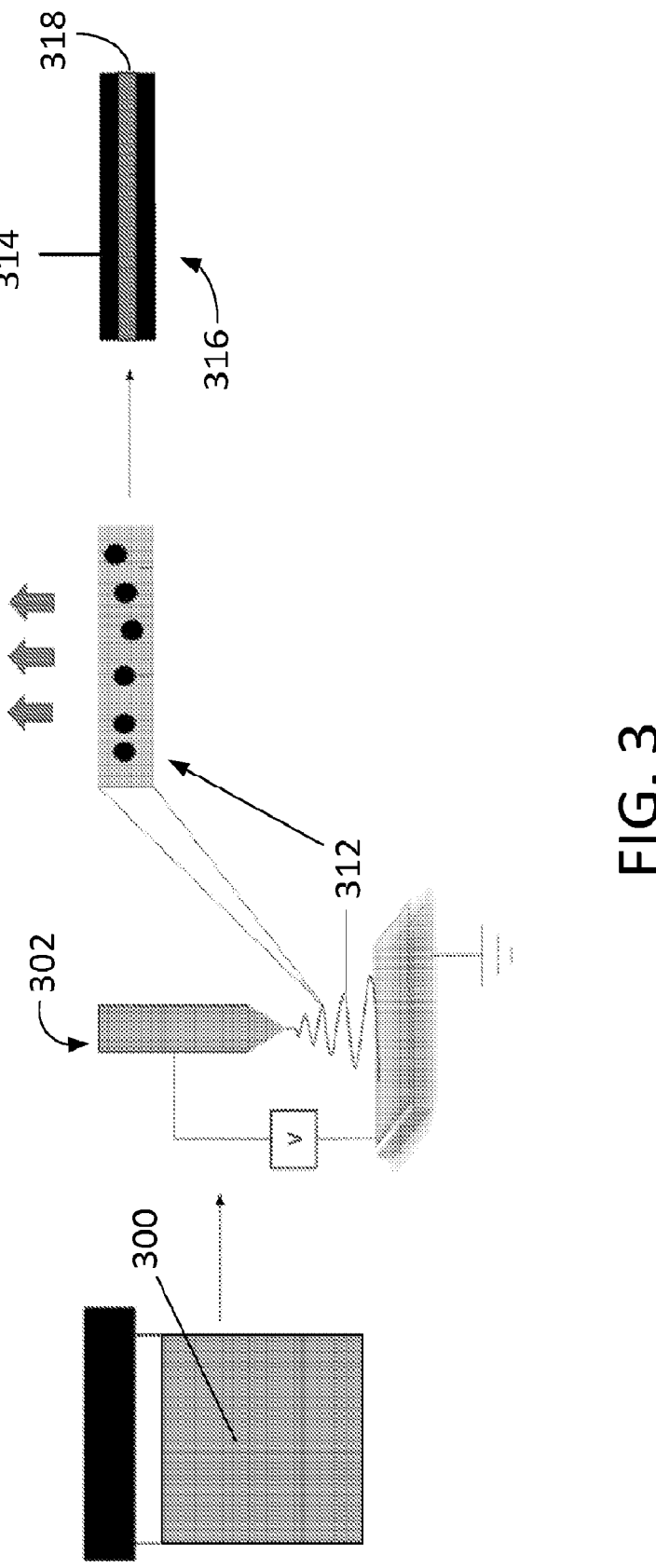
FIG. 3 is a schematic diagram depicting the formation of hollow fibers by electrospinning.

FIG. 3 is a schematic diagram depicting the formation of hollow fibers by electrospinning. Electrospin solution 300 including a polymer, an encapsulant, and a solvent is provided to electrospin apparatus 302. Examples of suitable polymers, encapsulants, and solvents are described with respect to electrospray solution 100 in FIG. 1. Electrospin apparatus 302 may operate in a manner similar to electrospray apparatus 102 in FIG. 1 to yield precursor fibers 312 with a mixture of solvent and the encapsulant contained in hollow polymer fiber 314. The solvent evaporates from precursor fibers 312 to yield encapsulant-containing polymer fibers 316 with encapsulant core 318 enclosed by hollow polymer fiber 314. In some cases, the encapsulant is removed from the opening along the length of the hollow polymer fibers (e.g., by solvent exchange).

In some embodiments, dry jet wet spinning can used to obtain microscale hollow fibers. In one example, a polymer such as polysulfone can be spun with an annular spinneret to yield a hollow fiber with an outer diameter in a range of about 0.5 mm to 1.5 mm and a wall thickness of about 150 μm to about 250 μm. These hollow fibers can be cut to length, the ends cured in epoxy resin of a fixed diameter, and loaded into hollow fiber membrane modules.

Figure 4:
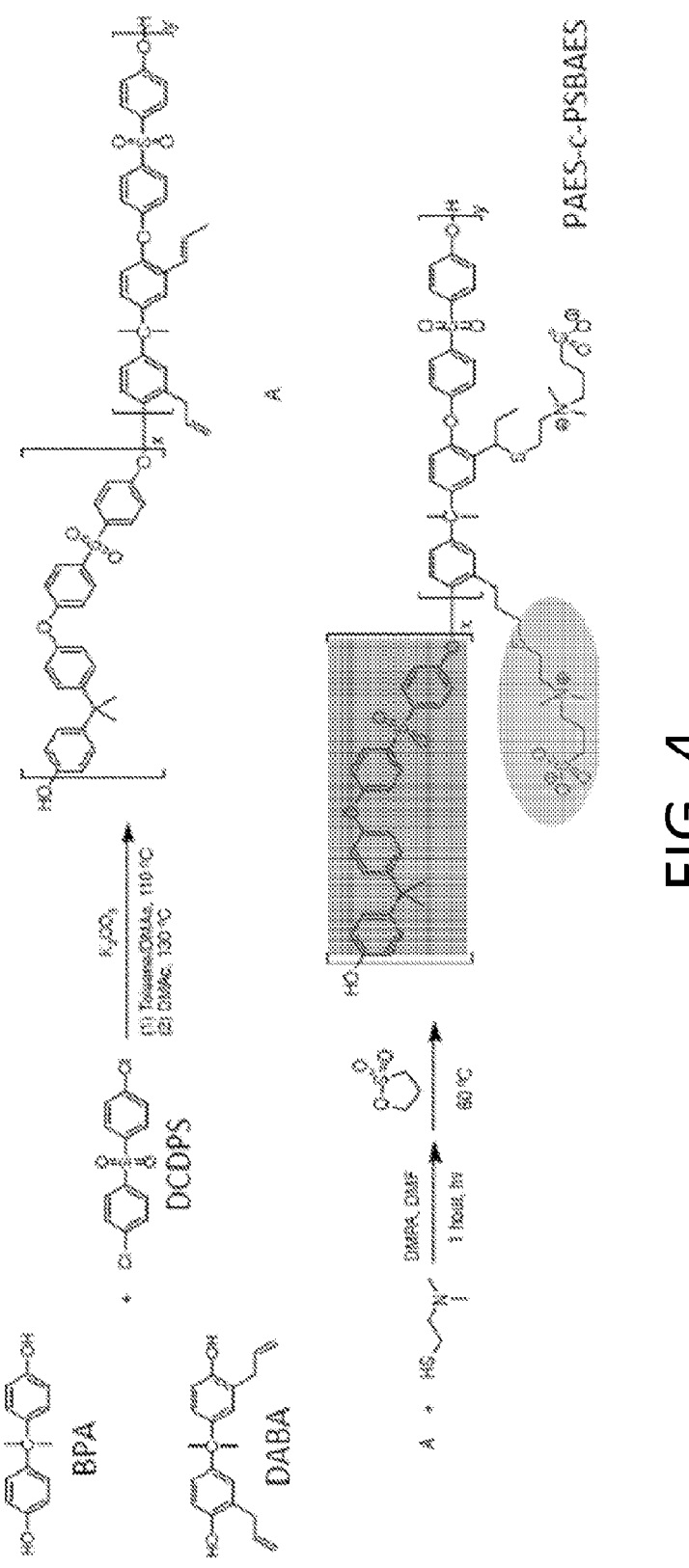
FIG. 4 is a schematic diagram depicting the reaction schematic for the preparation of zwitterionic polysulfone.

FIG. 4 is a reaction schematic depicting charge functionalization of a polysulfone backbone. Copolymers containing a poly(arylene ether sulfone) (PAES) backbone and charged sulfobetaine side chains are synthesized by step growth polymerization and post-polymerization modifications. PAES is a suitable backbone based at least in part on its high glass transition temperature (>200° C. for high molecular weights), strong mechanical properties, and intrinsic porosity. The allyl-modified PAES copolymer is prepared by introducing diallyl bisphenol A (DABA) at various ratios relative to bisphenol A (BPA), with dichlorodiphenylsulfone (DCDPS) or difluorodiphenylsulfone (DFDPS) in the presence of potassium carbonate in toluene/dimethylacetamide. This allows the functionalization of the PAES copolymers with pendant allyl groups after polymerization. The concentration of allyl functionality can be tailored by varying the monomer ratio of DABA/BPA. The polymers are synthesized by step-growth polymerization at temperatures below the standard conditions for polysulfone synthesis to reduce isomerization of allyl groups and other side reactions. $^1$H-NMR spectra confirm favorable polymerization behavior without significant isomerization. Subsequent post polymerization reactions can be used to introduce tertiary amines, and the zwitterion-modified copolymer is produced by ring-opening 1,3-propane sultone. The polysulfones can be modified to include ammonium, phosphonium, imidazolium, or other ionic groups. The composition of the charged group on the polymer can influence the IL solubility and capacity in the polymer support.

Other polymers, including polyethers and polystyrenics can also be functionalized after polymerization. Addition of charge sites in the polysulfone increases ionic liquid loading capacity and can reduce or prevent ionic liquid leaching. A poly(arylene ether sulfone) (PAES) backbone with charged sulfobetaine side chains can be synthesized using step-growth polymerization and post polymerization modifications. The zwitterionic polymer can be obtained with minimal isomerization. Polysulfone asymmetric membranes with different zwitterion content can be casted. Membranes with higher zwitterion content display fingerlike morphology with high innate surface area and porosity. Functionalization can be tailored such that certain encapsulants are preferentially adsorbed. The solubility of an IL can be improved by functionalizing the polymer with the cation of the IL (e.g., functionalizing a polymer with an imidazolium cation to improve the solubility of an imidazolium IL, functionalizing a polymer with an ammonium cation to improve the solubility of an ammonium IL, etc.).

Figure 5:
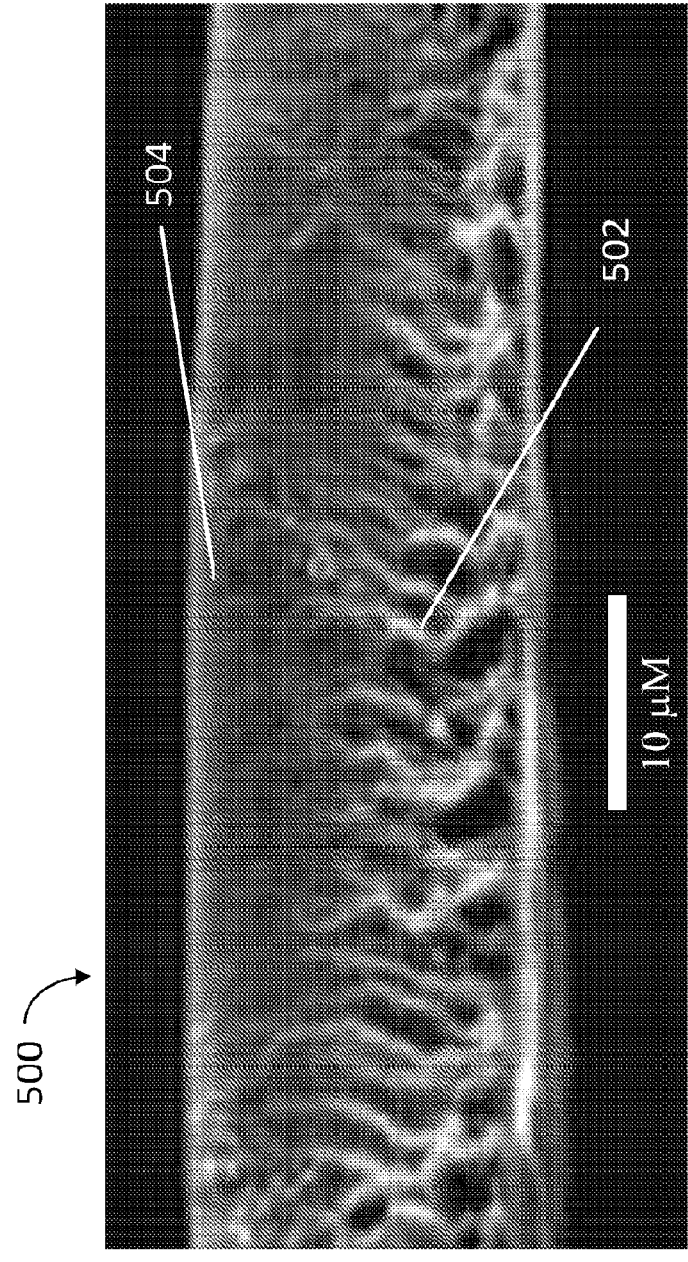
FIG. 5 shows the porous structure of polysulfone-asymmetric membranes with a zwitterion content of 4 wt %.
Figure 6B:
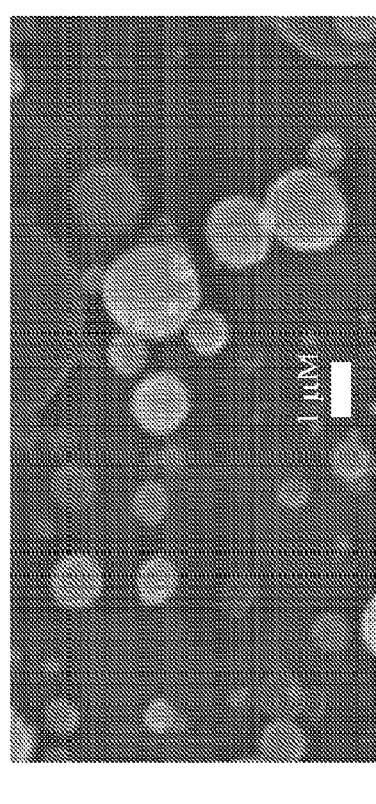
FIGS. 6A-6D show electrosprayed capsules formed without gas assistance.
Figure 6D:
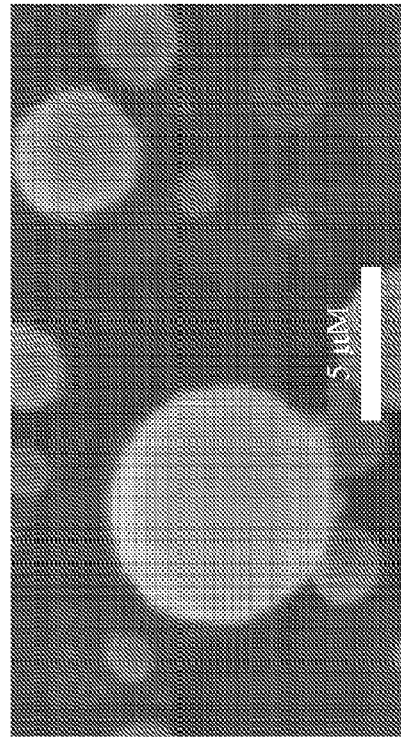
Figure 6A:
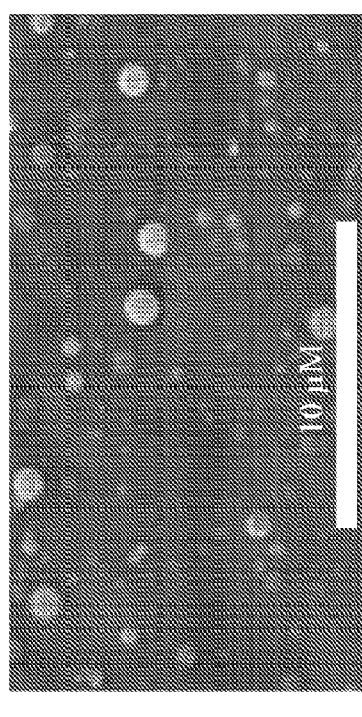
Figure 6C:
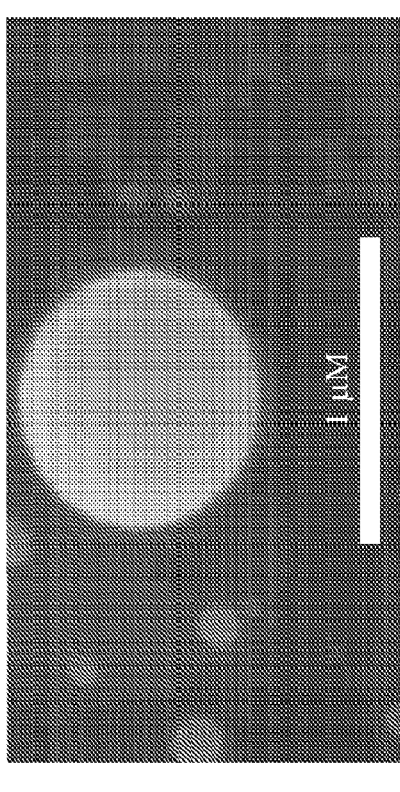

To induce porosity, the zwitterion-modified polymer can be dissolved in THF, deposited on a glass plate using a doctor blade, partially evaporated in air, and then immersed in a coagulation bath containing deionized water to prepare asymmetric membranes in a solvent/non-solvent-induced phase separation (SNIPS) or non-solvent-induced phase separation (NIPS) process. FIG. 5 is a cross-sectional SEM image that shows a zwitterionic membrane 500 with a zwitterion content of 4 wt % displaying sponge/finger-like porous sub layers 502 approximately 15 μm thick with an approximately 100 nm dense, skin layer 504 on the top surface. Thus, zwitterion-modified polysulfone can be used to form porous morphologies with high innate surface area suitable for IL support.

FIGS. 6A-6D show SEM images of porous microspheres and microcapsules formed in a single step air controlled electrospray encapsulation process with a solution of 8 wt % polysulfone (Mw 35,000) in dichloromethane (DCM) is prepared. The IL (1-butyl-3-methylimidazolium bis(trifluoromethylsulfonyl)imide ([bmim] [TFSI])) was added to this solution and left for 1 hour to yield a single phase solution of polysulfone-DCM and IL. The single phase solution was then added to a syringe which was connected to an 18 gauge nozzle with air nozzle kept at 12 gauge. The voltage at the nozzle was kept at +20 kV and the voltage at the collector was kept at −5 kV. The nozzle collector distance was 25 cm. The flow rate was 1 mL/hr and the gas pressure was kept at 10 psi. IL-containing polysulfone capsules having a diameter in a range of about 500 nm to about 10 μm were collected on the collector.

Figure 7:
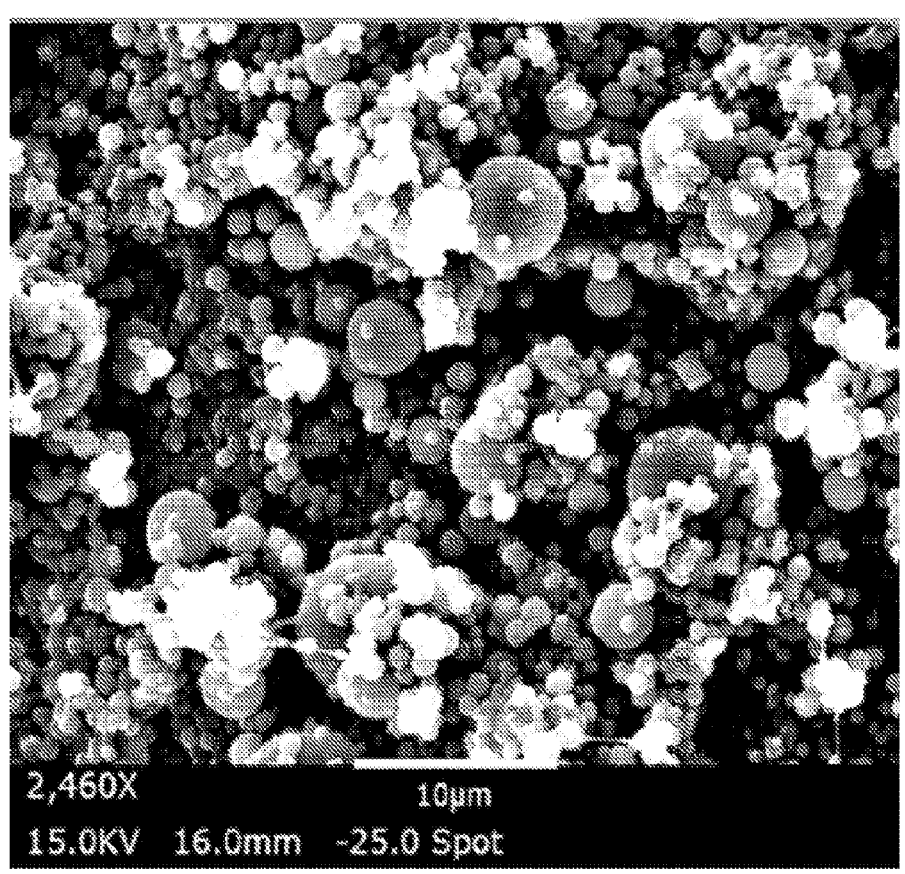
FIG. 7 is a scanning electron microscope (SEM) image of encapsulant-containing polymer capsules sprayed onto an aluminum foil.
Figure 8:
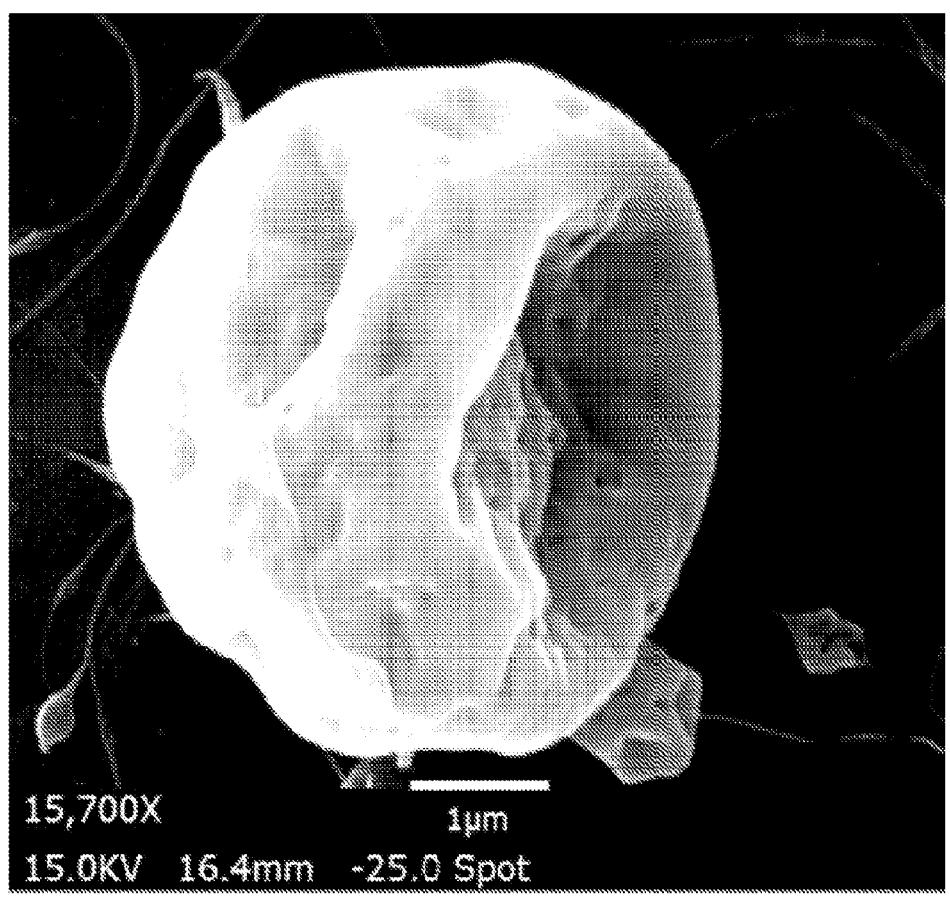
FIG. 8 high resolution SEM image of an electrosprayed encapsulant-containing polymer capsule sprayed onto an aluminum foil.
Figure 9:
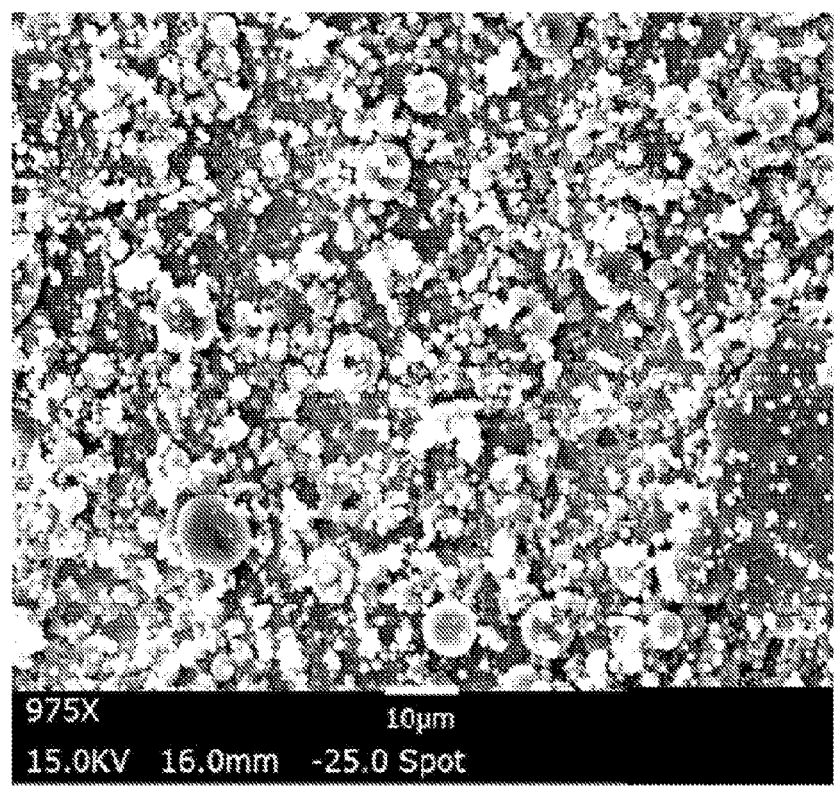
FIG. 9 is an SEM image of encapsulant-containing polymer capsules sprayed onto an aluminum foil.

FIGS. 7-9 show SEM images of polysulfone capsules formed during gas-assisted electrospraying. The addition of IL to the solution hinders the formation of a stable Taylor cone in conventional electrospraying, possibly from the increase in viscosity and surface tension. The gas stream helps overcome the surface tension and provides an additional driving force for the electrospraying process. The collector was connected to a negative voltage source instead of grounding, to have access to a higher potential gradient between the nozzle tip and collector.

Figure 10:
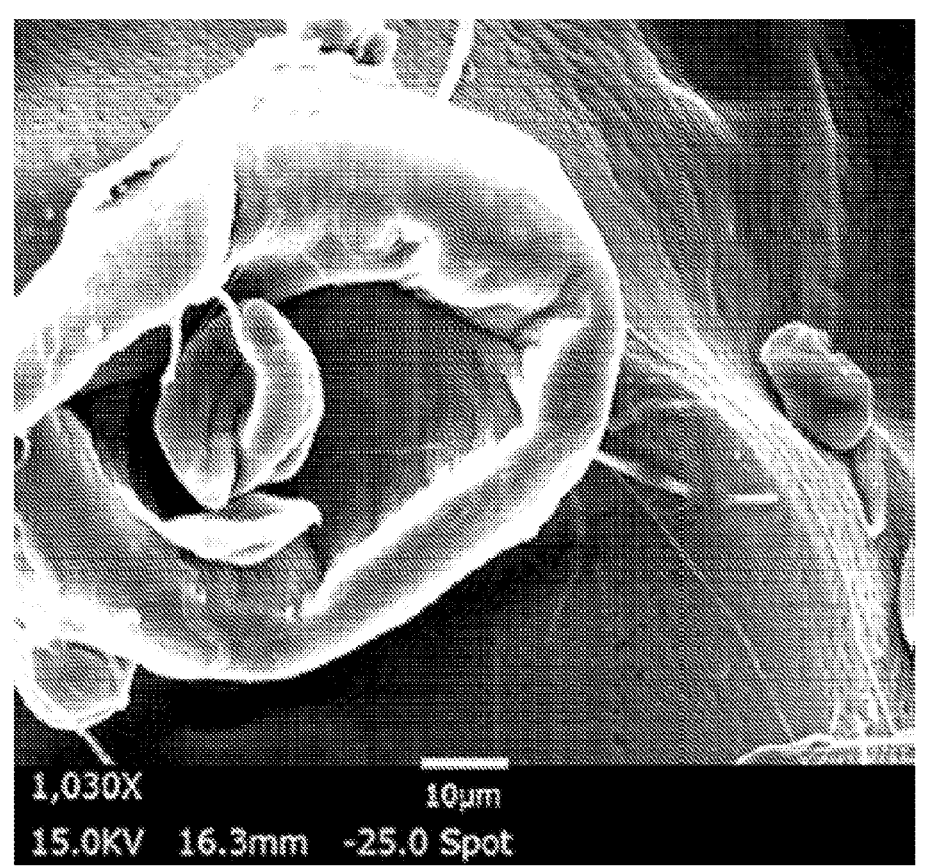
FIG. 10 is an SEM image of a broken polymer capsule prepared by an encapsulation technique as described herein.

FIG. 10 is a SEM image of a broken, hollow IL capsule formed by an emulsion process showing a hollow core. 9 wt % of polysulfone (Mw 35,000) was dissolved in dichloromethane (DCM). The total solution weight was kept at 40 g. Then, 2 g of 1-butyl-3-methylimidazolium bis(trifluoromethylsulfonyl)imide ([bmim] [TFSI]) was added to this solution and stirred for 2 hours to obtain a single phase solution with three components. Next, 100 mL of a 2 wt % PVA solution in deionized (DI) water was stirred at high rpm (>2000 rpm). The polysulfone-DCM-IL solution was added dropwise to the beaker containing the PVA, inducing emulsification of the polysulfone-DCM-IL solution in the PVA solution. Specifically, the PVA acts as a surfactant to emulsify the polysulfone-DCM-IL mixture. The addition was carried out slowly over the span of 30 min, but could vary based on the volumes of aqueous PVA and polysulfone-DCM-IL being used. The emulsified mixture was stirred for 1 hour at >2,000 rpm, after which the stirring was slowed down to 150 rpm and 200 mL of a 2 wt % aqueous PVA solution was added to stabilize the emulsion. As the DCM evaporates, the droplets of polysulfone-DCM-IL become rich in polysulfone and precipitate out. The polysulfone migrates to the surface, encapsulating the IL. The DCM evaporates completely after stirring overnight (approximately 18 h). The mixture is then filtered and dried in a vacuum oven to obtain polymer microcapsules with IL. Oil red O was used to stain the capsule and the IL to improve visual contrast. Encapsulation of the IL was confirmed by NMR spectroscopy.

Figure 11:
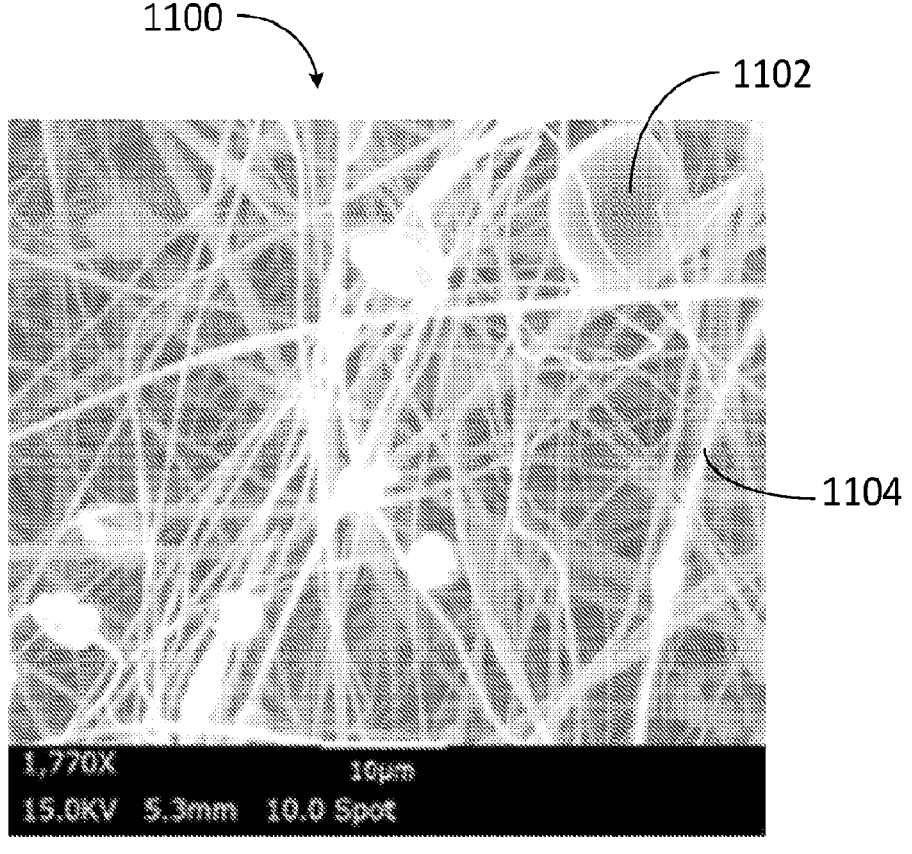
FIG. 11 is an SEM image of a fiber-encapsulant-containing polymer capsule composite formed by the electrospin-electrospray apparatus of FIG. 2B.

A composite fiber was prepared using an electrospray-electrospin apparatus such as that described with respect to FIG. 2B. For electrospraying, a solution of 8 wt % polysulfone (Mw 35,000) in dichloromethane (DCM) was prepared. IL (1-butyl-3-methylimidazolium bis(trifluoromethylsulfonyl)imide) was added to this solution. The mixture was left to for 1 hour to yield a single phase solution of polysulfone-DCM and IL. The solution was added to a syringe connected to an 18 gauge nozzle with the air nozzle kept at 12 gauge. The electrospin solution was a 15 wt % polysulfone solution (Mw 35,000) in N-methyl-2-pyrrolidone (NMP). This solution was then added to another syringe mounted on a syringe pump directly opposite to the syringe holding the electrospray solution. The voltage at the nozzles was kept at +20 kV. The collector kept between these two nozzles was a grounded rotating cylindrical drum wrapped in a metal foil. The apparatus was configured such that a straight line drawn connecting the nozzle tips passed through the diameter of the cylinder. The nozzle collector distance was 20 cm from both setups. The flow rate was 1 mL/hr, and the gas pressure was kept at 10 psi. The capsules and fibers were collected on the collector simultaneously. The SEM image in FIG. 11 shows composite 1100 with capsules 1102 having a diameter in a range of 500 nm to 10 μm embedded in fiber mat 1104.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of forming a plurality of polymer capsules containing an encapsulant, the method comprising:
    preparing a mixture comprising a polymer, a solvent, and an encapsulant, wherein the polymer is soluble in the solvent and the encapsulant comprises an ionic liquid;
    providing the mixture to a gas-assisted electrospray apparatus; and
    ejecting the mixture from the gas-assisted electrospray apparatus to form the plurality of polymer capsules, wherein each polymer capsule comprises a shell formed of the polymer and contains the encapsulant, and the encapsulant is in the form of a liquid.

2. The method of claim 1, wherein the solvent comprises water, dimethylformamide, tetrahydrofuran, chloroform, or any mixture thereof.

3. The method of claim 1, wherein the encapsulant is an ionic liquid.

4. The method of claim 1, wherein the ionic liquid comprises a phosphonium, ammonium, or imidazolium based ionic liquid.

5. The method of claim 4, wherein the ionic liquid comprises 1-butyl-3-methylimidazolium bis(trifluoromethylsulfonyl)imide or bis(2,4,4-trimethylpentyl)phosphinate.

6. The method of claim 1, wherein the polymer comprises polysulfone, polyacrylonitrile, polyvinyl chloride, polyvinylidene fluoride, or poly(methyl methacrylate).

7. The method of claim 1, wherein each of the polymer capsules has an outer diameter in a range of about 500 nm to about 20 μm.

8. The method of claim 1, wherein a gas pressure of the gas-assisted electrospray apparatus is in a range of 5 psi to 40 psi.

9. The method of claim 1, wherein a gas of the gas-assisted electrospray apparatus comprises argon, nitrogen, oxygen, carbon dioxide, or a combination thereof.

* * * * *